US008489841B1

(12) United States Patent
Strecke et al.

(10) Patent No.: US 8,489,841 B1
(45) Date of Patent: Jul. 16, 2013

(54) MANUFACTURING STATION DYNAMICALLY CONFIGURING A DATA STORAGE DEVICE WITH A VALIDATED CONFIGURATION DATA RECORD

(75) Inventors: Karsten C. Strecke, Huntington Beach, CA (US); Marc A. Bombet, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 718 days.

(21) Appl. No.: 12/635,487

(22) Filed: Dec. 10, 2009

(51) Int. Cl.
*G06F 12/00* (2006.01)

(52) U.S. Cl.
USPC .... 711/170; 711/112; 711/102; 711/E12.001; 711/E1.084; 710/8; 717/168

(58) Field of Classification Search
None
See application file for complete search history.

(56) References Cited

U.S. PATENT DOCUMENTS

| 5,440,716 | A | 8/1995 | Schultz et al. |
| 5,515,524 | A | 5/1996 | Lynch et al. |
| 5,657,448 | A | 8/1997 | Wadsworth et al. |
| 5,682,513 | A | 10/1997 | Candelaria et al. |
| 5,913,218 | A | 6/1999 | Carney et al. |
| 5,996,027 | A | 11/1999 | Volk et al. |
| 6,247,128 | B1 | 6/2001 | Fisher et al. |
| 6,301,696 | B1 | 10/2001 | Lien et al. |
| 6,587,124 | B1 | 7/2003 | Slaby |
| 6,640,278 | B1 | 10/2003 | Nolan et al. |
| 6,862,704 | B1 | 3/2005 | Miner |
| 6,895,500 | B1 | 5/2005 | Rothberg |
| 7,024,614 | B1 | 4/2006 | Thelin et al. |
| 7,058,759 | B1 | 6/2006 | Reiser et al. |
| 7,106,541 | B2 | 9/2006 | Bruner et al. |
| 7,162,578 | B2 | 1/2007 | Bruner et al. |
| 7,188,330 | B2 | 3/2007 | Goyal |
| 7,289,291 | B1 | 10/2007 | Schlumberger |
| 7,450,084 | B2 | 11/2008 | Fuller et al. |
| 7,555,570 | B2 | 6/2009 | Hickey et al. |
| 7,577,783 | B2 | 8/2009 | Hsu et al. |
| 7,590,835 | B1 * | 9/2009 | Nallagatla et al. ............ 717/169 |
| 7,613,842 | B2 | 11/2009 | Kong |
| 7,685,441 | B2 | 3/2010 | Burton et al. |
| 7,984,200 | B1 | 7/2011 | Bombet et al. |
| 2001/0039648 | A1 * | 11/2001 | Imamura et al. .................. 717/3 |
| 2002/0073304 | A1 * | 6/2002 | Marsh et al. ...................... 713/1 |
| 2002/0095537 | A1 * | 7/2002 | Slater ............................. 711/111 |
| 2003/0023966 | A1 * | 1/2003 | Shimizu et al. ............... 717/175 |
| 2003/0070053 | A1 | 4/2003 | Gallo et al. |
| 2003/0084112 | A1 * | 5/2003 | Curray et al. ................. 709/208 |
| 2003/0095648 | A1 * | 5/2003 | Kaib et al. ............... 379/106.02 |
| 2003/0115297 | A1 | 6/2003 | Branson et al. |
| 2004/0059537 | A1 | 3/2004 | McIntosh et al. |
| 2004/0088367 | A1 | 5/2004 | Reinke |
| 2004/0088473 | A1 * | 5/2004 | Ogle ............................ 711/100 |

(Continued)

OTHER PUBLICATIONS

U.S. Appl. No. 12/236,278, filed Sep. 23, 2008, 23 pages.

(Continued)

*Primary Examiner* — Michael Krofcheck (57) ABSTRACT

A method is disclosed of configuring a data storage device. A manufacturing procedure is executed to generate a configuration data record. The configuration data record is compared to configuration execution records of an executable file, wherein the configuration execution records are for configuring at least one configuration file of the data storage device. When the configuration data record interlocks with the configuration execution records, the configuration file is modified.

21 Claims, 11 Drawing Sheets

U.S. PATENT DOCUMENTS

| | | |
|---|---|---|
| 2005/0177829 A1 | 8/2005 | Vishwanath |
| 2005/0195515 A1 | 9/2005 | Bruner et al. |
| 2005/0240686 A1 | 10/2005 | Kashiwagi |
| 2005/0251799 A1* | 11/2005 | Wang .......................... 717/168 |
| 2005/0273549 A1 | 12/2005 | Roohparvar |
| 2006/0031454 A1 | 2/2006 | Ewing et al. |
| 2006/0200262 A1 | 9/2006 | Dyer |
| 2006/0252522 A1 | 11/2006 | Walker et al. |
| 2007/0152058 A1 | 7/2007 | Yeakley et al. |
| 2007/0180168 A1 | 8/2007 | Chikusa et al. |
| 2007/0220248 A1 | 9/2007 | Bittlingmayer et al. |
| 2008/0010685 A1 | 1/2008 | Holtzman et al. |
| 2008/0045177 A1 | 2/2008 | Wise |
| 2008/0256406 A1 | 10/2008 | Arnold |
| 2008/0313628 A1 | 12/2008 | Justus et al. |
| 2009/0028339 A1 | 1/2009 | Goodman et al. |
| 2009/0106546 A1* | 4/2009 | Weichel et al. ................ 713/100 |
| 2009/0172384 A1 | 7/2009 | Anson |
| 2009/0213655 A1 | 8/2009 | Roohparvar |
| 2011/0231424 A1 | 9/2011 | Avdanina |

OTHER PUBLICATIONS

U.S. Appl. No. 12/253,832, filed Oct. 17, 2008, 31 pages.

* cited by examiner

GUI PARAMETER SETUP

| Feature/Parameter | Customer 1 | Customer 2 |
|---|---|---|
| ATA Security Supported | true | false |
| Offline Scan Supported | true | false |
| Timer | 0400 | 0700 |
| Acoustic Management Enable | true | false |
| Level | Performance Mode | Performance Mode / Quiet Mode / Factory Mode |
| Firmware Version Supported | true | false |
| Version | "HP 10.6.7.00.1" | "DELL 10.6.7.00.1" |
| Model Number String | Dynamic | Dynamic |
| Customer Capacity LBA | Dynamic | Dynamic |

FIG. 2A

| Feature/Parameter | Customer 1 | Customer 2 |
|---|---|---|
| ATA Security | | |
| Supported | true | false |
| Offline Scan | | |
| Supported | true | false |
| Timer | 0400 | 0700 |
| Acoustic Management | | |
| Enable | true | false |
| Level | ◇ Performance Mode | ◇ Performance Mode / Quiet Mode / Factory Mode |
| Firmware Version | | |
| Supported | true | false |
| Version | "HP 10.6.7.00.1" | "DELL 10.6.7.00.1" |
| Model Number String | ◇ Dynamic Not Required | ◇ Dynamic Required / Dynamic Not Required |
| Customer Capacity LBA | ◇ Dynamic Required | ◇ Dynamic Required |

GUI PARAMETER SETUP

FIG. 2B

```
// Structure for 0x115 record
typedef struct
{
    UINT32   signature;
    UINT16   feature_id;
    UINT16   parameter_id;
    UINT16   parameter_type;
    UINT16   parameter_length;
    VAR      parameter_value;
}
```

FIG. 3A

```
// Structure for 0x118 record
typedef struct
{
    UINT16   feature_id;
    UINT16   parameter_id;
    UINT16   parameter_type;
    UINT16   parameter_length;
    UINT16   actual_length;
    UINT8    feat_enabled;
    UINT16   file_section;
    UINT16   file_offset;
    UINT16   bit_number;
    UINT32   expected_value
    UINT8    setting_no;
    UINT8    settints_per_feature;
}
```

FIG. 3B

// ** ATA Security **

{1, 1, BOOLEAN, LENGTH_BYTE, sizeof (CFG_DRV_LOCK), ENABLE, FM_CONFIG_DATA, PASSWORD_OFFSET, CFG_DRV_LOCK_OFFSET, PS_CAPABLE, 1, 1, 2}, {1, 1, BOOLEAN, LENGTH_BYTE, sizeof (CFG_AUTHENTICATION), ENABLE, FM_CONFIG_DATA, PASSWORD_OFFSET, CFG_AUTHENTICATION_OFFSET, PWEN, 1, 2, 2}, {1, 1, BOOLEAN, LENGTH_BYTE, sizeof (CFG_DRV_LOCK), DISABLE, FM_CONFIG_DATA, PASSWORD_OFFSET, CFG_DRV_LOCK_OFFSET, PS_CAPABLE, 0, 1, 2}, {1, 1, BOOLEAN, LENGTH_BYTE, sizeof (CFG_AUTHENTICATION), DISABLE, FM_CONFIG_DATA, PASSWORD_OFFSET, CFG_AUTHENTICATION_OFFSET, PWEN, 0, 2, 2}, // ** Offline Scan **

{2, 1, BOOLEAN, LENGTH_BYTE, sizeof (SMART_VAR_GEN_PURPOSE_FLAG), ENABLE, FM_DRM_PROTO_LOG, SECTION8_OFFSET, GPD_LSUBSECTION1_OFFSET, AUTO_OL_ENABLED_BIT, 1, 1, 1}, {2, 1, BOOLEAN, LENGTH_BYTE, sizeof (SMART_VAR_GEN_PURPOSE_FLAG), DISABLE, FM_DRM_PROTO_LOG, SECTION8_OFFSET, GPD_LSUBSECTION1_OFFSET, AUTO_OL_ENABLED_BIT, 0, 1, 1}, {2, 2, VALUE, sizeof (CFG_OFFLINE_TIMER) , sizeof (CFG_OFFLINE_TIMER), ENABLE, FM_CONFIG_DATA, BACKGROUND_OFFSET, CFG_OFFLINE_TIMER_OFFSET, UNRELATED, UNRELATED, 1, 1},

FIG. 4A

// ** Automatic Acoustic Management (AAM) **
{3, 1, BOOLEAN, LENGTH_BYTE, sizeof (CFG_ACMGTEN), ENABLE, FM_CONFIG_DATA, FEATURES_OFFSET, CFG_CONTROL_OFFSET, ACMGTEN, 1, 1, 1},
{3, 1, BOOLEAN, LENGTH_BYTE, sizeof (CFG_ACMGTEN), DISABLE, FM_CONFIG_DATA, FEATURES_OFFSET, CFG_CONTROL_OFFSET, ACMGTEN, 0, 1, 1}, {3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(0), 0, 1, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(1), 0, 2, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Perform_Mode, 1), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(4), 1, 5, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(5), 1, 6, 7},
{3, 2, ENUM, LENGTH_BYTE, sizeof (CFG_AC_LVL), ENUM(Quiet_Mode, 2), FM_CONFIG_DATA, FEATURES_OFFSET, CFG_AC_LVL_OFFSET, BIT(6), 0, 7, 7}, {3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(0), 1, 1, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(1), 1, 2, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(2), 0, 3, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(3), 0, 4, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(4), 0, 5, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(5), 0, 6, 7},
{3, 2, ENUM, LENGTH_BYTE, sizeof (CFG_AC_LVL), ENUM(Factory_Mode, 3), FM_CONFIG_DATA, FEATURES_OFFSET, CFG_AC_LVL_OFFSET, BIT(6), 0, 7, 7}, // ** Firmware Version **
{4, 1, STRING, LENGTH_STRING, sizeof (FW_VERSION), ENABLE, FM_CONFIG_DATA, FIRMWARE_OFFSET, FW_SUPPORT_OFFSET, FWSUP, 1, 1, 1},
{4, 1, STRING, LENGTH_STRING, sizeof (FW_VERSION), DISABLE, FM_CONFIG_DATA, FIRMWARE_OFFSET, FW_SUPPORT_OFFSET, FWSUP, 0, 1, 1}, {4, 2, STRING, LENGTH_STRING, sizeof (FW_VERSION), UNRELATED, FM_CONFIG_DATA, FIRMWARE_OFFSET, VERSION_OFFSET, UNRELATED, UNRELATED, 1, 1},

FIG. 4B

// Model Number String

{18,6,(TYPE_STRING + TYPE_ATTR_DYNAMIC),HOST2_DELL_PPID_SIZE,HOST2_DELL_PPID_SIZE,ENABLE,FM_HOST2_LOG,HOST2_DELL_PPID,UNRELATED,UNRELATED,1,1},

// Customer Capacity LBA

{47,2,(TYPE_VALUE+TYPE_ATTR_DYNAMIC),sizeof(FIELD_LIST_DESTROKE_MAX_LBA),sizeof(FIELD_LIST_DESTROKE_MAX_LBA), ENABLE, FM_FIELD_LIST_DATA, FIELD_LIST_CAPACITY_OFFSET,FIELD_LIST_DESTROKE_MAX_LBA_OFFSET, UNRELATED, UNRELATED, 1, 3}, {47,2,(TYPE_VALUE+TYPE_ATTR_DYNAMIC),sizeof(FIELD_LIST_DCO_MAX_LBA),  sizeof(FIELD_LIST_DCO_MAX_LBA),  ENABLE, FM_FIELD_LIST_DATA, FIELD_LIST_CAPACITY_OFFSET, FIELD_LIST_DCO_MAX_LBA_OFFSET,   UNRELATED, UNRELATED, 2, 3}, {47,2,(TYPE_VALUE+TYPE_ATTR_DYNAMIC),sizeof(FIELD_LIST_HOST_MAX_LBA),  sizeof(FIELD_LIST_HOST_MAX_LBA),   ENABLE,FM_FIELD_LIST_DATA, FIELD_LIST_CAPACITY_OFFSET,FIELD_LIST_HOST_MAX_LBA_OFFSET,  UNRELATED, UNRELATED, 3, 3},

MANUFACTURING STATION DYNAMICALLY CONFIGURING A DATA STORAGE DEVICE WITH A VALIDATED CONFIGURATION DATA RECORD

BACKGROUND

Description of the Related Art

When manufacturing data storage devices, such as disk drives, each data storage device is typically manufactured according to the specifications of each individual customer (e.g., each PC manufacturer). For example, certain features may be available or not, or the disk drive may be configured to operate in various modes of operation, such as different security modes, different performance/acoustic modes, etc. Configuring the disk drive typically involves modifying configuration files stored in the disk drive. When a disk drive is powered on, the control circuitry reads the configuration files and configures itself accordingly.

Each data storage device may be configured with a number of predetermined parameters configured by a feature specification engineer (e.g., using a spreadsheet). In addition, a manufacturing station may dynamically configure various parameters within each data storage device in an assembly line fashion. For example, the manufacturing station may configure a capacity of each data storage device after executing a manufacturing procedure that calibrates the capacity (e.g., a manufacturing procedure that determines the track density of a disk). However, if the firmware for the manufacturing station and the data storage device are incompatible (e.g., due to a firmware upgrade), the manufacturing station may miss-configure the data storage devices leading to thousands of defective products.

BRIEF DESCRIPTION OF THE DRAWINGS

FIGS. 4A, 4B and 4C show example configuration execution records in the form of a table in an ".h" file according to an embodiment of the present invention.

DETAILED DESCRIPTION OF EMBODIMENTS OF THE INVENTION

Figure 1A:
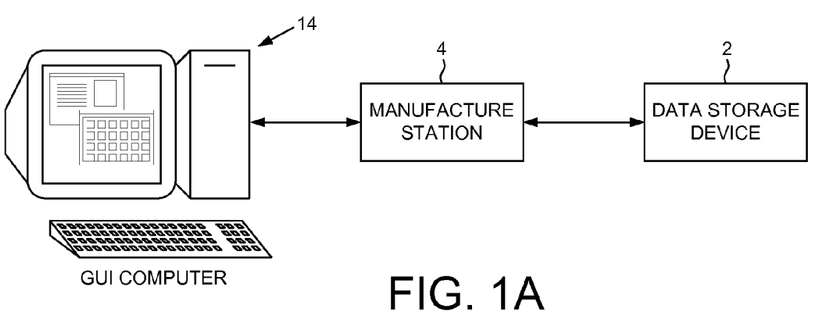
FIG. 1A shows a manufacturing station for configuring a data storage device by generating a configuration data record according to an embodiment of the present invention.
Figure 1B:
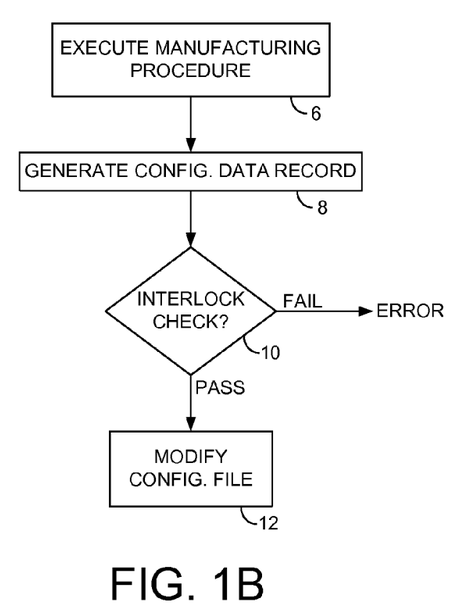
FIG. 1B is a flow diagram according to an embodiment of the present invention wherein the configuration data record is compared to configuration execution records of an executable file to perform an interlock check.

FIGS. 1A and 1B illustrate a method of configuring a data storage device 2 according to an embodiment of the present invention. A manufacturing procedure is executed by a manufacturing station 4 (step 6) to generate a configuration data record (step 8). The configuration data record is compared to configuration execution records of an executable file (step 10), wherein the configuration execution records are for configuring at least one configuration file of the data storage device 2. When the configuration data record interlocks with the configuration execution records, the configuration file is modified (step 12).

Figure 2A:
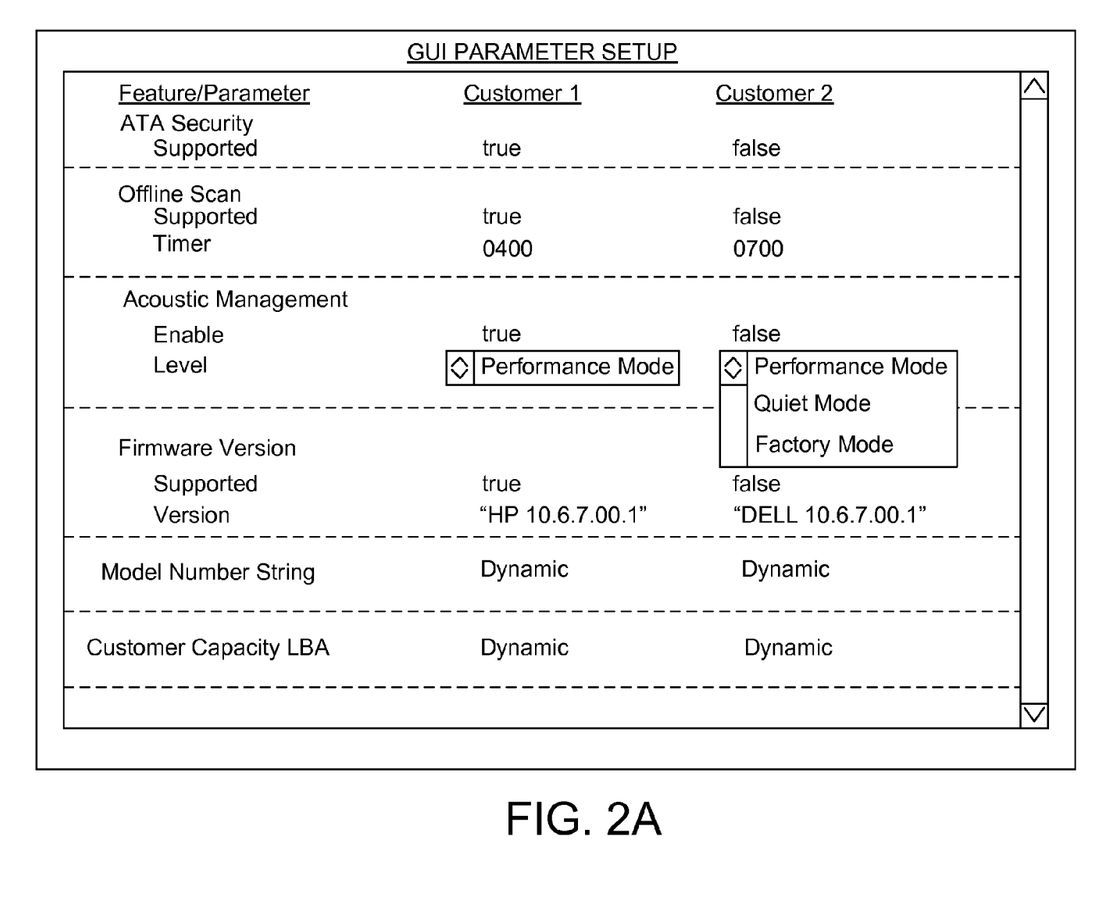
FIG. 2A illustrates an embodiment of the present invention wherein a graphical user interface is employed to identify the configuration data records (dynamic parameters) that are generated by the manufacturing station.

In the embodiment of FIG. 1A, a computer 14 displays a graphical user interface (GUI) for configuring a parameter file containing a plurality of configuration data records. FIG. 2A shows an example GUI for configuring a number of features, wherein each feature may have one or more parameters. Each parameter may be one of a plurality of types, such as a Boolean type, a value type, an enumerated type, or a string type. In an embodiment described below with reference to FIG. 4C, a parameter may further comprise an attribute of "dynamic" indicating that the value for the parameter is provided by executing a manufacturing procedure. The GUI may display the configuration settings for a number of different configurations, for example, for a number of different customers (e.g., PC manufactures). In one embodiment, the GUI protects against invalid user input. For example, the GUI may provide only two possible values for a Boolean type (true or false), or the GUI may limit the possible settings for a value type. Similarly, an enumerated type may be restricted to only the values that may be selected from a drop-down menu as illustrated in FIG. 2A. A string value (e.g., the firmware version parameter) may be limited by a minimum and/or maximum number of characters for the string.

In one embodiment, the value for certain parameters are determined by a manufacturing procedure for each data storage device (i.e., dynamic parameters). In the example of FIG. 2A, the dynamic parameters determined during manufacturing include a model number string and a capacity for the data storage device. After configuring the static parameters shown in FIG. 2A, the corresponding parameter file is provided to the manufacturing station 4 of FIG. 1A which determines the dynamic parameter values and then programs each data storage device 2 with the appropriate parameter values (static and dynamic).

Figures 3A, 3B:
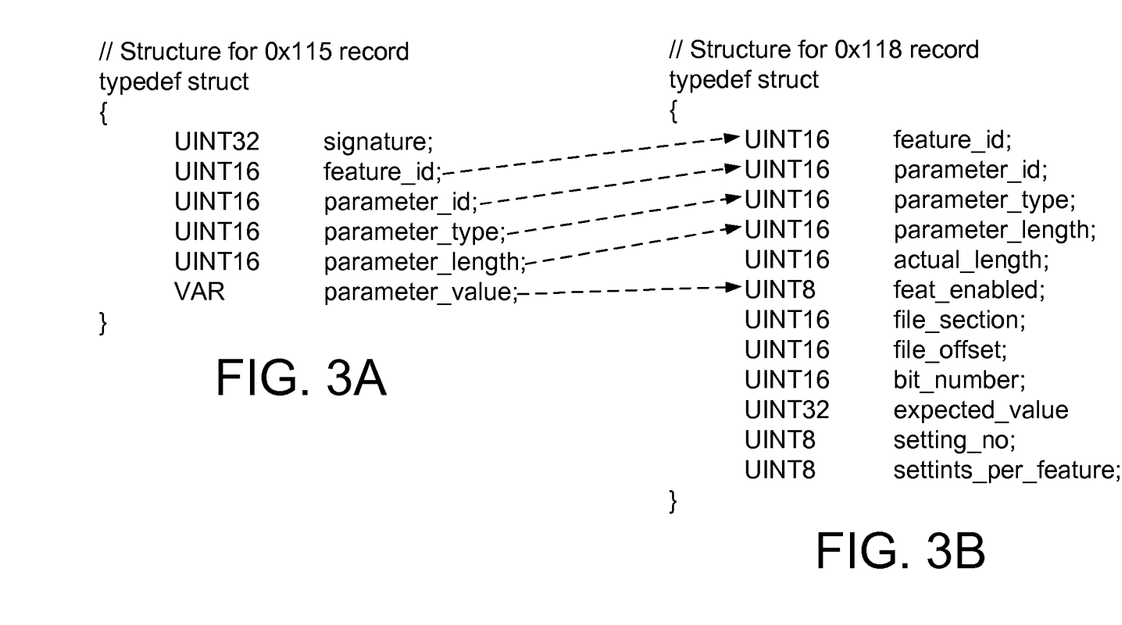
FIG. 3A shows a configuration data structure according to an embodiment of the present invention.
FIG. 3B shows a configuration execution record according to an embodiment of the present invention.

The process of programming each data storage device with the parameter values includes a validity check to ensure configuration data records generated by the manufacturing station interlock with configuration execution records of the data storage device. FIG. 3A shows an example format for a configuration data record (a 0x115 record), and FIG. 3B shows an example format for a configuration execution record (a 0x118 record). The 0x115 record comprises a signature field which stores a special value that demarks the beginning of the record within the 0x115 file. The feature ID identifies the feature number, and the parameter ID identifies the parameter number. The parameter type may be any suitable value (e.g., Boolean, value, enumerated, string, etc.), and the parameter length specifies the byte length of the parameter value. The length of the parameter value may vary, for example, if the parameter type is string. Since the parameter value has a variable length, the signature field identifies the beginning of each 0x115 record in the 0x115 file.

In one embodiment, the common fields between a 0x115 record are compared to the 0x118 records in order to determine whether the 0x115 record interlocks with one of the 0x118 records. The parameter value of the 0x115 record may also be compared to a feature_enabled field of the 0x118 record. In one embodiment, there must be a match between all of the interlock fields in order to find an interlocking record. If an interlock is found, the remaining fields of the 0x118 record specify how to modify the configuration file of the data storage device in order to implement the requested configuration. In the example of FIG. 3B, the fields of a 0x118 record include an actual length field which specifies the actual length (bits or bytes) to modify in the configuration file. A file section field, file offset field, and bit number field specify the exact location within the configuration file to modify. In addition, certain 0x115 records may correspond to multiple 0x118 records that modify multiple settings of a configuration file (e.g., multiple bits). In this embodiment, the 0x118 records further include a settings_per_feature field and a setting_no field which specify the total number of settings and the setting number being configured for a particular 0x118 record.

Figure 4A:
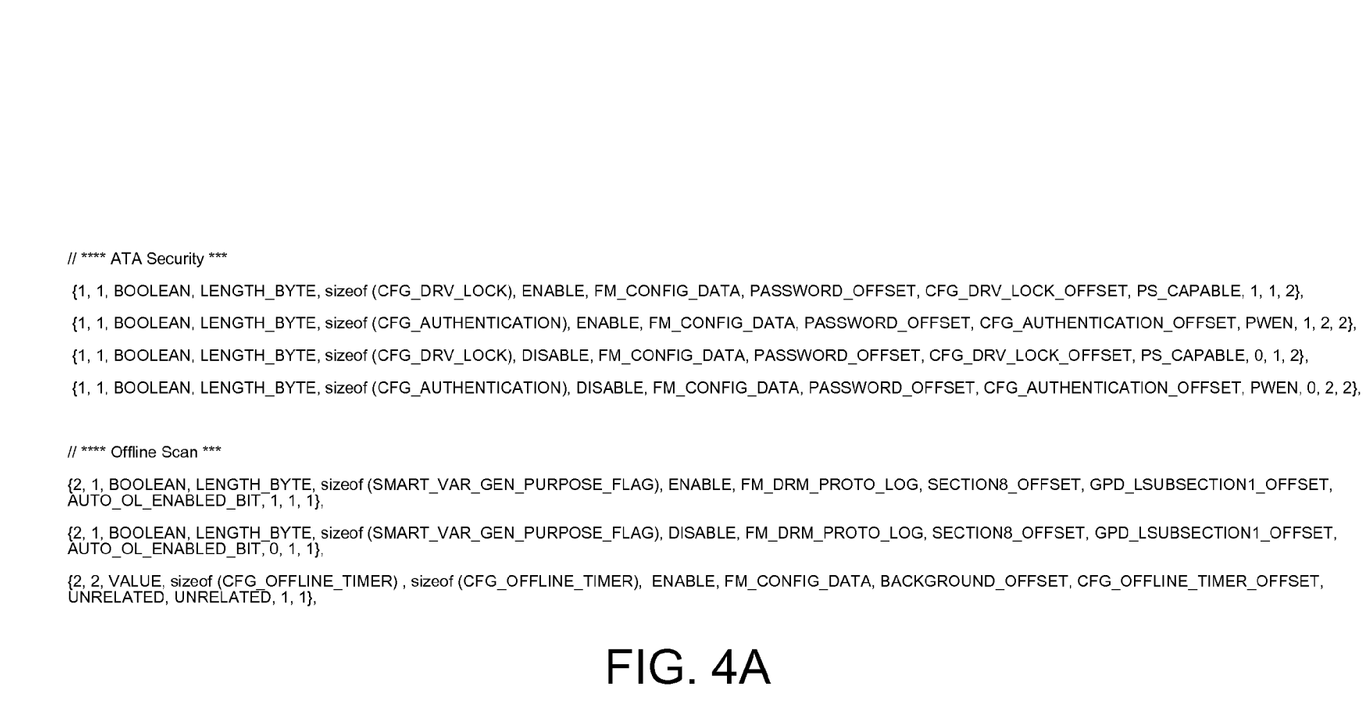

The 0x118 records may be implemented in any suitable manner, and in an embodiment illustrated in FIGS. 4A and 4B, the 0x118 records are implemented as a table defined in an ".h" file. The first four entries in the table of FIG. 4A correspond to an ATA security setting. The feature ID is one, the parameter ID is one, and the type is Boolean indicating the ATA security feature is either enabled or disabled. The feature_enabled field specifies either "ENABLE" or "DISABLE", followed by three fields which specify the location within the configuration file to modify. In this example, there are two bits that are configured (set or reset) and therefore there are two corresponding table entries. When a 0x115 record is received to configure this feature, all of the corresponding fields must match, including whether to ENABLE or DISABLE the feature. When a match is found, the configuration file is modified as specified by the two table entries of the matching 0x118 record.

The second feature in FIG. 4A corresponds to an offline scan of a disk drive. This feature has a first Boolean parameter to enable/disable the feature, and a second value parameter (a timer) that specifies how long the disk drive must remain idle before beginning (or continuing) the offline scan. Since the timer is of type value, the expected_value field of the 0x118 record is set to UNRELATED since there is no expected value. The bit_number field of the 0x118 record is also set to UNRELATED since the value modifies one or more bytes.

FIG. 4B illustrates an enumerated parameter (the second parameter of the AAM feature) wherein there are three possible values for the enumerated value (see the example of FIG. 2A). For each of the three possible values, a byte in the configuration file is modified with a particular bit pattern. In other words, the byte in the configuration file can only take on three possible values as defined by the 0x118 record, and these three values correspond to the only possible selections provided in the drop-down menu of the GUI in FIG. 2A. When a match between a 0x115 record and the 0x118 record is found, there will be a match of all seven table entries shown in FIG. 4B, and therefore all seven table entries will be processed in order to configure the corresponding byte of the configuration file. The last feature in FIG. 4B corresponds to a firmware version which comprises a Boolean parameter indicating whether the feature is enabled, and a string value for specifying the version number (see FIG. 2A). Similar to a value type, with a string type the expected_value of the corresponding 0x118 record is set to UNRELATED since there is no expected value for a string type.

Figure 4C:
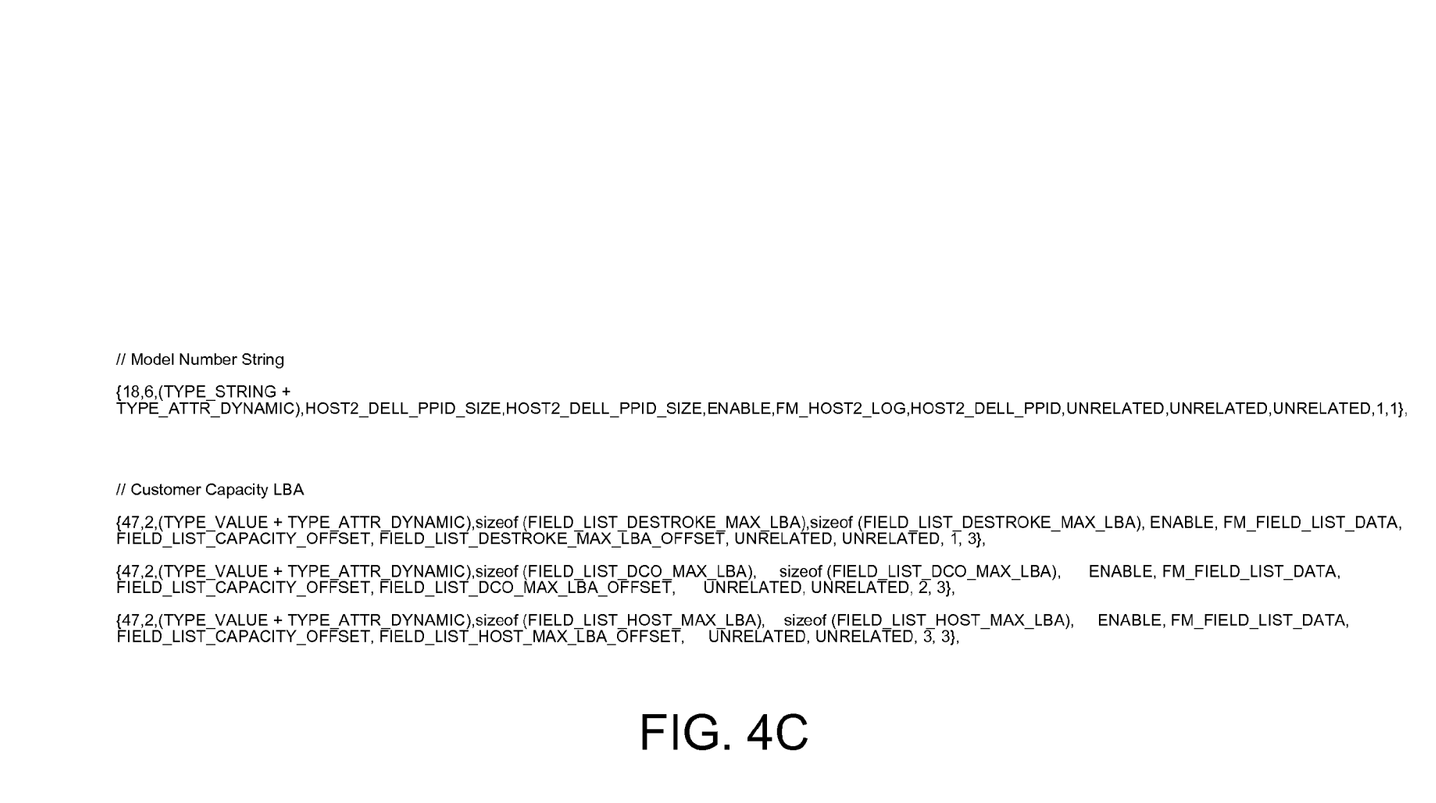

FIG. 4C shows example features comprising dynamic parameters, such as a Model Number String and a Customer Capacity LBA. The Model Number String is configured by the manufacturing station based on the configuration of each data storage device, including the dynamic parameter settings. The parameter is identified as being dynamic by assigning an attribute of TYPE_STRING+TYPE_ATT_DYNAMIC. There is no expected value so the expected_value field of the 0x118 record is set to UNRELATED (the value for the string is passed as a separate parameter). FIG. 4C also shows a dynamic value parameter for configuring a capacity of the data storage device. For example, the manufacturing procedure may determine a capacity of the data storage device based on calibrated characteristics, such as a geometry of a read head which may determine the maximum tracks per inch in a disk drive, or the sensitivity of the read head which may determine the maximum bits per inch in a disk drive. Once the capacity of the data storage device is determined, the Customer Capacity LBA configures the maximum number of corresponding logical block addresses (LBAs) for the data storage device.

Figure 5A:
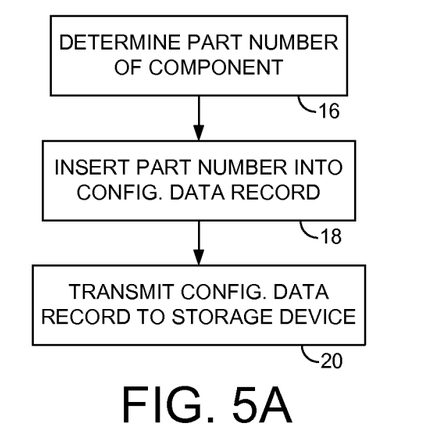
FIG. 5A is a flow diagram according to an embodiment of the present invention wherein a manufacturing procedure inserts a component part number into the configuration data record.

Any suitable manufacturing procedure may be executed to configure a dynamic parameter of the data storage device. FIG. 5A is a flow diagram according to an embodiment of the present invention wherein the manufacturing procedure determines a part number for a component of the data storage device (step 16). For example, the manufacturing procedure may determine a part number for a head installed into a disk drive. The part number is inserted into a configuration data record (step 18), and the configuration data record is transmitted to the data storage device (step 20). In this embodiment, the control circuitry within the data storage device performs the interlock check to verify that the configuration data record matches one of the executable data records.

Figure 5B:
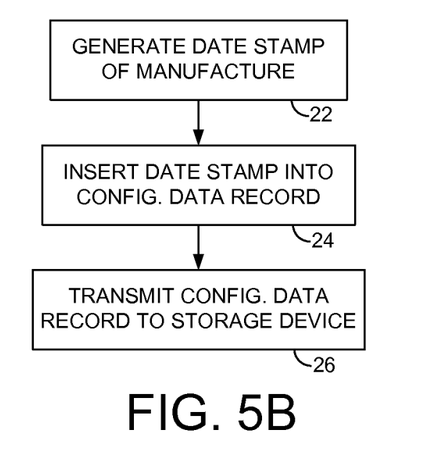
FIG. 5B is a flow diagram according to an embodiment of the present invention wherein a manufacturing procedure inserts a manufacturing date stamp into the configuration data record.

FIG. 5B is a flow diagram according to an embodiment of the present invention wherein the manufacturing procedure determines a date stamp identifying a date of manufacture of each data storage device (step 22). The date stamp is inserted into a configuration data record (step 24), and the configuration data record is transmitted to the data storage device (step 26).

Figure 6:
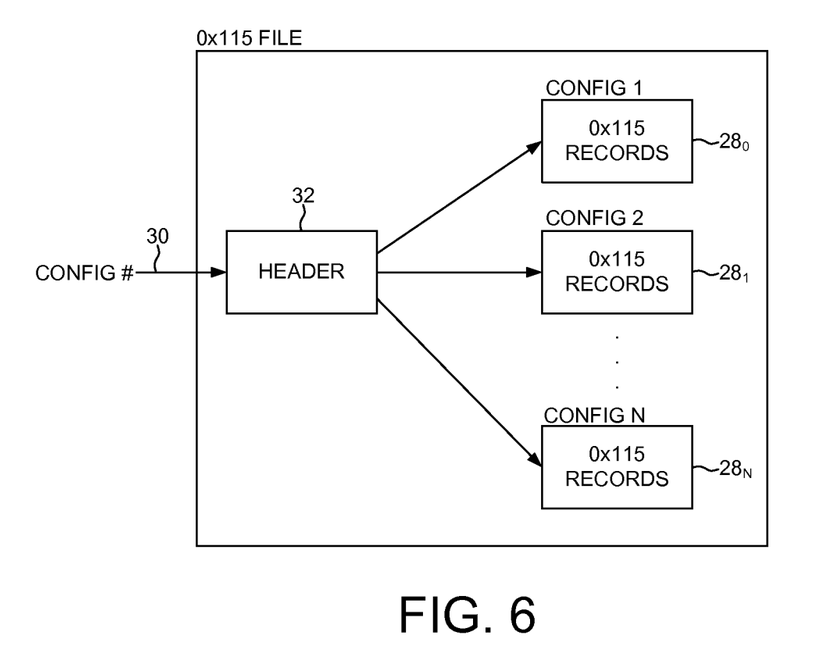
FIG. 6 shows an embodiment of the present invention wherein a configuration data file stores a plurality of configuration data record sets each corresponding to a particular configuration for the data storage device.

FIG. 6 shows an embodiment of the present invention wherein the 0x115 file comprises a plurality of 0x115 record sets $28_0$-$28_N$, wherein each 0x115 record set 28, corresponds to a particular configuration (e.g., for a particular customer). A configuration code 30 is received by the data storage device which indexes a header structure 32 that is used to select the corresponding 0x115 record set. This embodiment enables a single firmware version (including 0x115 file and 0x118 file) to be downloaded into a data storage device, and then to configure the data storage device into a desired state. For example, the data storage device may be configured into various states in order to perform various manufacturing test procedures, and then configured into a final state corresponding to a particular customer (e.g., a PC manufacture).

Figure 7:
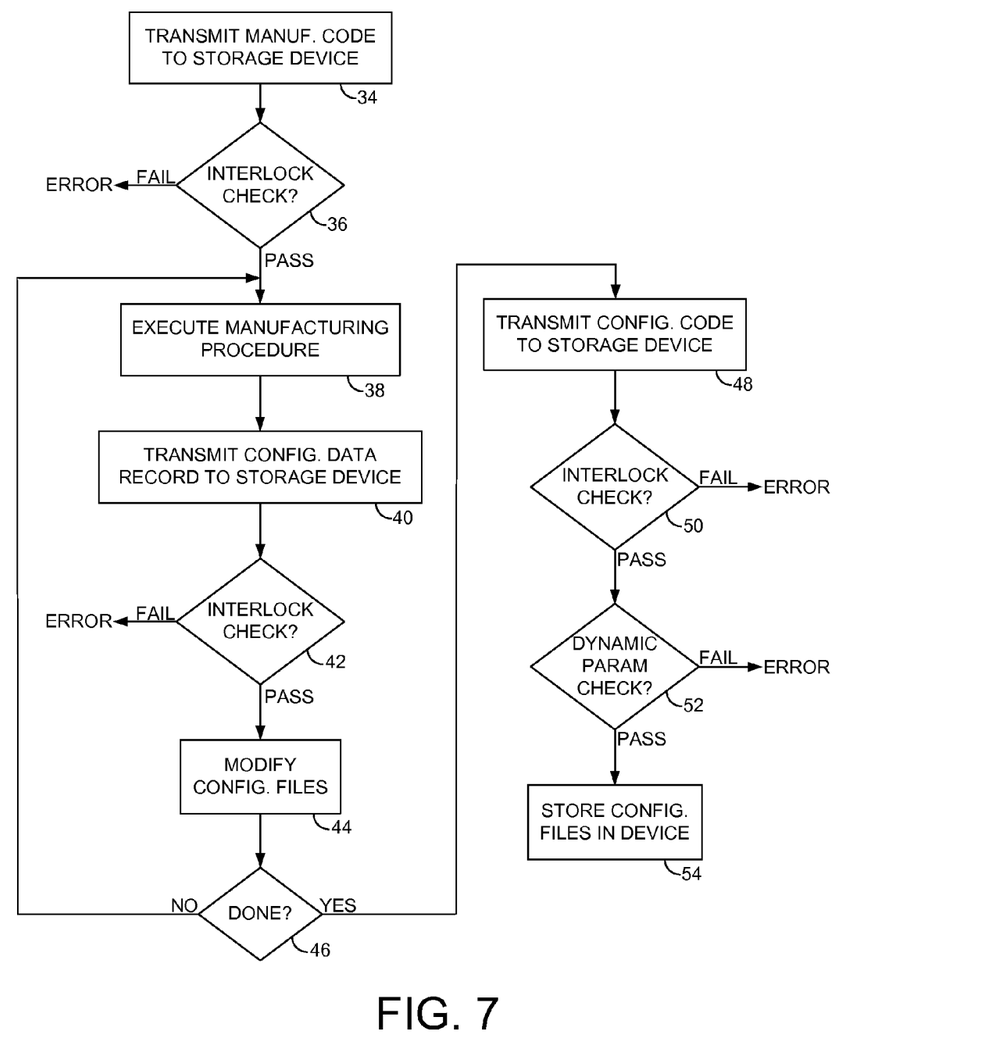
FIG. 7 is a flow diagram according to an embodiment of the present invention wherein the data storage device is first configured into a manufacturing state, the configuration data records are generated by the manufacturing procedure and interlocked checked, the data storage device is configured into a particular customer state, and a check is made to ensure all of the required dynamic parameters have been configured by the manufacturing procedures.

This embodiment is further understood with reference to the flow diagram of FIG. 7 wherein a manufacturing code is transmitted to a data storage device (step 34) to configure it into a manufacturing state. The corresponding 0x115 record set 28, is selected and an interlock check performed to verify all of the configuration data records interlock with corresponding executable data records (step 36). If the interlock check passes, a manufacturing procedure is executed in order to generate a configuration data record storing a dynamic parameter value (step 38). The configuration data record is transmitted to the data storage device (step 40) which performs an interlock check as described above (step 42). If the interlock check passes, the corresponding configuration file (s) is modified (step 44) (in one embodiment, the configuration file is modified after being read into a volatile memory). This process is repeated for different manufacturing procedures until all of the dynamic parameter values have been configured (step 46). A customer configuration code is then transmitted to the data storage device (step 48) in order to configure the data storage device into a target customer state (e.g., for a particular PC manufacture). The corresponding 0x115 record set 28, is selected and an interlock check performed to verify all of the configuration data records interlock with corresponding executable data records (step 50). In one embodiment, the dynamic parameter values previously transmitted to the data storage device (step 40) are saved and used to modify the configuration file after receiving the customer configuration code (step 48). That is, if processing the customer configuration code at step 48 causes the dynamic parameters to be reset, or if a new customer configuration code is received that causes the dynamic parameters to be reset, the saved dynamic parameter values previously received from the manufacturing procedures are used to reconfigure the dynamic parameters in the configuration file.

Figure 2B:
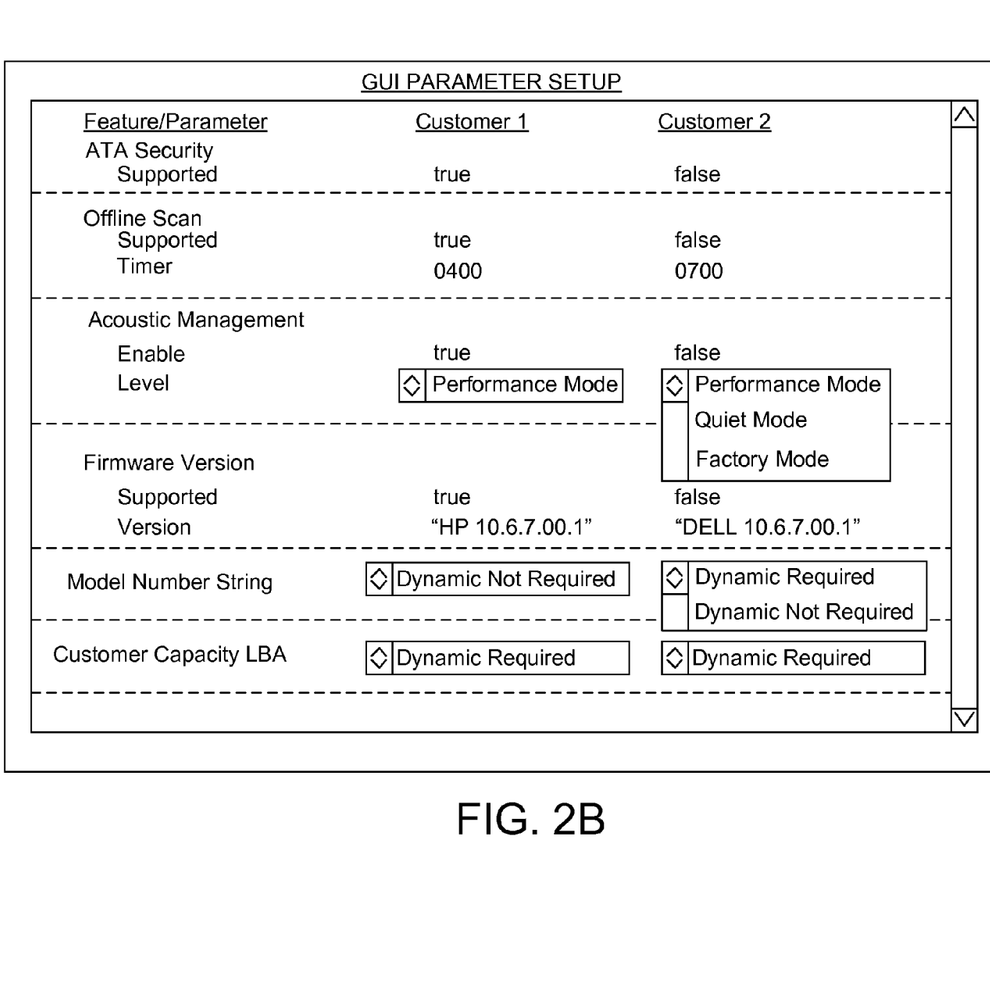
FIG. 2B illustrates an embodiment of the present invention wherein the dynamic parameters are designated as required or not required.

In one embodiment, if the interlock check passes (step 50), another check is performed by the data storage device to verify that all of the required dynamic parameters have been configured by the manufacturing procedures (step 52). This embodiment is understood with reference to FIG. 2B which shows an example GUI where each of the dynamic parameters are designated as "Required" or "Not Required". If a dynamic parameter is designated as "Required" it means that the corresponding parameter must be configured with a dynamic parameter value during manufacturing. Referring again to the flow diagram of FIG. 7, if a value for a dynamic parameter designated as "Required" has not been provided by a manufacturing procedure, an error message is generated (step 52). Otherwise, the modified configuration files stored in the volatile memory are saved in a non-volatile memory (step 54), such as on a disk of a disk drive or in a flash memory of a solid state drive. The configuration files are subsequently used to configure the data storage device while in the field knowing that the configuration files are compatible with the firmware version of the data storage device.

In the embodiment of FIG. 7, each dynamic parameter is configured individually by transmitting a corresponding configuration data record to the data storage device. In an alternative embodiment, a plurality of configuration data records are aggregated after performing a number of corresponding manufacturing procedures. The aggregated configuration data records are then transmitted to the data storage device in a single transaction in order to configure the dynamic parameters in a bulk operation.

Figure 8:
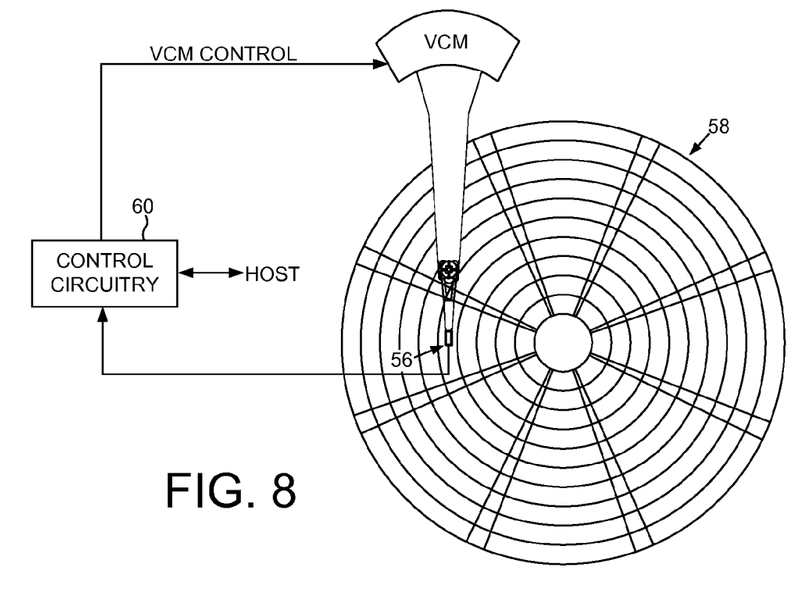
FIG. 8 shows an embodiment of the present invention wherein the data storage device comprises a disk drive.
Figure 9:
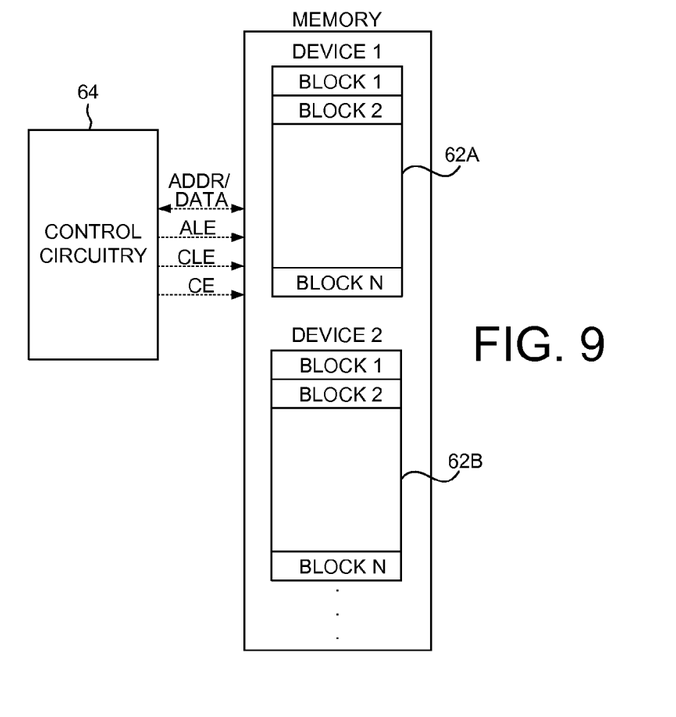
FIG. 9 shows an embodiment of the present invention wherein the data storage device comprises a solid state drive.

The embodiments of the present invention may be employed in any suitable data storage device comprising any suitable storage medium, such as a magnetic medium, optical medium, or semiconductor medium. FIG. 8 shows a data storage device comprising a disk drive including a head 56 actuated over a disk 58 and control circuitry 60 for executing at least part of the flow diagrams described herein. FIG. 9 shows a solid state drive comprising a plurality of non-volatile semiconductor memories 62A, 62B, etc., such as flash memories, and control circuitry 64 for executing at least part of the flow diagrams described herein. A hybrid data storage device may also be employed comprising components of a disk drive shown in FIG. 8 combined with the non-volatile semiconductor memories shown in FIG. 9.

Any suitable control circuitry may be employed to implement the flow diagrams in the embodiments of the present invention, such as any suitable integrated circuit or circuits. For example, in the embodiment where the data storage device comprises a disk drive, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A method of configuring a data storage device comprising:
    executing an automated manufacturing procedure independent of user input to generate a configuration data record;
    comparing the configuration data record to configuration execution records of an executable file, wherein:
        the configuration execution records are generated using a header file; and
        the configuration execution records are for configuring at least one configuration file of the data storage device; and
    when the configuration data record interlocks with the configuration execution records, modifying the configuration file.

2. The method as recited in claim 1, wherein the configuration data record is compared to the configuration execution records within the data storage device.

3. The method as recited in claim 1, further comprising generating an error message when the configuration data record fails to interlock with the configuration execution records.

4. The method as recited in claim 1, wherein the manufacturing procedure calibrates a capacity of the data storage device and the configuration data record for configuring a capacity of the data storage device.

5. The method as recited in claim 1, wherein the manufacturing procedure generates a model number of the data storage device and the configuration data record comprises the model number.

6. The method as recited in claim 1, wherein the manufacturing procedure generates a part number identifying a component of the data storage device and the configuration data record comprises the part number.

7. The method as recited in claim 1, wherein the manufacturing procedure generates a date stamp identifying a manufacturing date of the data storage device and the configuration data record comprises the date stamp.

8. The method as recited in claim 1, further comprising evaluating the configuration file to determine whether required parameters have been configured.

9. The method as recited in claim 1, wherein the data storage device comprises a semiconductor memory.

10. The method as recited in claim 1, wherein the data storage device comprises a magnetic medium.

11. The method as recited in claim 1, wherein the data storage device comprises a disk.

12. A data storage device comprising control circuitry operable to:
   receive a configuration data record from an automated manufacturing procedure that is executed independent of user input;
   compare the configuration data record to configuration execution records of an executable file, wherein:
      the configuration execution records are generated using a header file; and
      the configuration execution records are for configuring at least one configuration file of the data storage device; and
   when the configuration data record interlocks with the configuration execution records, modify the configuration file.

13. The data storage device as recited in claim 12, wherein the control circuitry is further operable to generate an error message when the configuration data record fails to interlock with the configuration execution records.

14. The data storage device as recited in claim 12, wherein the manufacturing procedure calibrates a capacity of the data storage device and the configuration data record for configuring a capacity of the data storage device.

15. The data storage device as recited in claim 12, wherein the manufacturing procedure generates a model number of the data storage device and the configuration data record comprises the model number.

16. The data storage device as recited in claim 12, wherein the manufacturing procedure generates a part number identifying a component of the data storage device and the configuration data record comprises the part number.

17. The data storage device as recited in claim 12, wherein the manufacturing procedure generates a date stamp identifying a manufacturing date of the data storage device and the configuration data record comprises the date stamp.

18. The data storage device as recited in claim 12, wherein the control circuitry is further operable to evaluate the configuration file to determine whether required parameters have been configured.

19. The data storage device as recited in claim 12, wherein the data storage device comprises a semiconductor memory.

20. The data storage device as recited in claim 12, wherein the data storage device comprises a magnetic medium.

21. The data storage device as recited in claim 12, wherein the data storage device comprises a disk.

\* \* \* \* \*